(12) United States Patent
Batchu et al.

(10) Patent No.: US 9,131,444 B2
(45) Date of Patent: Sep. 8, 2015

(54) OPTIMIZED PAGE MATCHING

(71) Applicant: QUALCOMM Incorporated, San Diego, CA (US)

(72) Inventors: Bhaskara V. Batchu, Hyderabad (IN); Venkata Siva Prasad Gude, Hyderabad (IN); Anand Rajurkar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 13/633,280

(22) Filed: Oct. 2, 2012

(65) Prior Publication Data

US 2013/0107776 A1     May 2, 2013

Related U.S. Application Data

(60) Provisional application No. 61/553,770, filed on Oct. 31, 2011.

(51) Int. Cl.
| | |
|---|---|
| *H04W 76/04* | (2009.01) |
| *H04L 5/00* | (2006.01) |
| *H04W 52/02* | (2009.01) |
| *H04W 68/02* | (2009.01) |

(52) U.S. Cl.
CPC ........ *H04W 52/0229* (2013.01); *H04W 68/025* (2013.01); *H04L 5/0053* (2013.01); *H04W 52/0216* (2013.01); *H04W 76/048* (2013.01)

(58) Field of Classification Search
CPC . H04W 84/18; H04W 48/08; H04W 52/0216; H04W 56/002; H04W 84/12; H04W 52/0219; H04W 36/18; H04W 4/006; H04W 52/0232; H04W 52/0245; H04W 52/24; H04W 52/40; H04W 52/44; H04W 52/58; H04W 68/00; H04W 76/048; H04W 52/0229; H04W 68/025; H04L 5/0053
USPC .......................... 370/254–350; 709/201–213
See application file for complete search history.

(56) References Cited

U.S. PATENT DOCUMENTS

| | | | | |
|---|---|---|---|---|
| 5,729,540 | A | * | 3/1998 | Wegrzyn ....................... 370/336 |
| 5,930,706 | A | | 7/1999 | Raith |
| 6,240,304 | B1 | | 5/2001 | Blankenstein et al. |
| 6,421,540 | B1 | * | 7/2002 | Gilhousen et al. ............ 455/458 |
| 6,480,476 | B1 | * | 11/2002 | Willars ........................ 370/311 |
| 6,687,285 | B1 | * | 2/2004 | Jou ............................... 375/133 |
| 6,765,893 | B1 | | 7/2004 | Bayley |
| 6,889,067 | B2 | | 5/2005 | Willey |
| 7,212,831 | B2 | | 5/2007 | Lee |
| 7,630,701 | B2 | | 12/2009 | Sollenberger et al. |
| 8,681,731 | B2 | | 3/2014 | Kreuzer et al. |
| 2005/0186973 | A1 | | 8/2005 | Gaal et al. |
| 2013/0303139 | A1 | * | 11/2013 | Helfre et al. .................. 455/417 |

OTHER PUBLICATIONS

International Search Report and Written Opinion—PCT/US2012/062782—ISA/EPO—Jan. 31, 2013.

* cited by examiner

*Primary Examiner* — Ayaz Sheikh
*Assistant Examiner* — Debebe Asefa
(74) *Attorney, Agent, or Firm* — Stanton Braden

(57) ABSTRACT

Devices, systems, articles of manufacture, and methods for optimized page matching is disclosed. According to some embodiments, a portion of a sub-slot is read. A page message is extracted from the portion of the sub-slot. A page matching procedure is performed prior to the end of the sub-slot. Other aspects, embodiments, and features are also claimed and described.

30 Claims, 8 Drawing Sheets

OPTIMIZED PAGE MATCHING

RELATED APPLICATION AND PRIORITY CLAIM

This application is related to and claims priority to U.S. Provisional Patent Application Ser. No. 61/553,770, filed Oct. 31, 2011, for "OPTIMIZED PAGE MATCHING," which is incorporated herein by reference for all purposes and as if fully set forth below.

TECHNICAL FIELD

The present disclosure relates generally to wireless communication systems. More specifically, the present disclosure relates to systems and methods for optimized page matching.

BACKGROUND

Wireless communication systems are widely deployed to provide various types of communication content such as voice, video, data, and so on. These systems may be multiple-access systems capable of supporting simultaneous communication of multiple mobile devices with one or more base stations.

Within wireless communications systems, base stations may periodically send page messages to mobile devices residing in wireless networks. Page messages may notify a mobile device of an incoming voice call or give channel assignments to a mobile device. To receive these page messages, the mobile device needs to wake-up from sleep mode. Current wake-up methods can be improved.

SUMMARY OF SOME EXAMPLE EMBODIMENTS

Devices, systems, articles of manufacture, and methods for optimized page matching is disclosed. According to some embodiments, a portion of a sub-slot is read. A page message is extracted from the portion of the sub-slot. A page matching procedure is performed prior to the end of the sub-slot.

A procedure may be initiated to return to sleep mode if the page matching procedure indicates that the page message is an empty general page message (GPM). A procedure may be initiated to switch to active mode if the page matching procedure indicates that the page message is a direct page message.

The method may be performed by a wireless communication device. A procedure may be initiated to return to sleep mode if the page message is neither an empty general page message (GPM) nor a direct page message and the wireless communication device has been awake for eight consecutive sub-slots. A portion of a next sub-slot may be read if the page message is neither an empty general page message (GPM) nor a direct page message and the wireless communication device has not been awake for eight consecutive sub-slots. Sleep time of the wireless communication device may be increased. The wireless communication device may be operating in an optimal network that transmits one of an empty general page message (GPM) and a direct page message during a first sub-slot of a slot. The wireless communication device may be operating in a non-optimal network that transmits one of an empty general page message (GPM) and a direct page message during a sub-slot subsequent to a first sub-slot of a slot.

The awake time of one subscription in slotted mode may be reduced, thereby reducing the conflicts between dual subscriptions wake-up in dual SIM dual standby devices. The page matching procedure may include quick page matching. The page message may be received via a paging channel. The page message may not be received via a quick paging channel.

According to another embodiment, a wireless device configured for optimized page matching is described. The wireless device includes a processor and executable instructions stored in memory that is in electronic communication with the processor. The wireless device reads a portion of a sub-slot. The wireless device also extracts a page message from the portion of the sub-slot. The wireless device additionally performs a page matching procedure prior to the end of the sub-slot.

According to yet another embodiment, a computer-program product for optimized page matching is described. The computer-program product includes a non-transitory computer-readable medium having instructions thereon. The computer-program product includes instructions for reading a portion of a sub-slot. The computer-program product also includes instructions for extracting a page message from the portion of the sub-slot. The computer-program product further includes instructions for performing a page matching procedure prior to the end of the sub-slot.

According to yet another embodiment, a wireless device configured for optimized page matching is described. The wireless device includes means for reading a portion of a sub-slot. The wireless device also includes means for extracting a page message from the portion of the sub-slot. The wireless device further includes means for performing a page matching procedure prior to the end of the sub-slot.

Other aspects, features and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

More and more people are using wireless communication devices, for example, mobile phones, not only for voice but also for data communications. CMDA2000 is one such standard used for providing voice, data and signaling services to and from wireless communication devices. A CDMA network may implement a radio technology such as Universal Terrestrial Radio Access (UTRA), CDMA2000, etc. UTRA includes W-CDMA and Low Chip Rate (LCR) while CDMA2000 covers Interim Standard 2000 (IS-2000), IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA and GSM are part of Universal Mobile Telecommunication System (UMTS). Long Term Evolution (LTE) is a release of UMTS that uses E-UTRA. UTRA, E-UTRA, GSM, UMTS and Long Term Evolution (LTE) are described in documents from an organization named "3rd Generation Partnership Project" (3GPP). CDMA2000 is described in documents from an organization named "3rd Generation Partnership Project 2" (3GPP2).

In CDMA2000, a paging channel is used to transmit page messages to wireless communication devices in standby mode (also called idle mode). During standby mode, a wireless communication device continuously consumes power to sustain the circuitry needed to monitor the signals transmitted from a base station. Continual monitoring of the paging channel for page messages in standby mode may significantly deplete battery power. In other words, elongating the time taken to monitor the paging channel results in excess power consumption. Because many wireless communication devices are portable and are powered by an internal battery, prolonging monitoring time unnecessarily consumes power and significantly shortens battery life. Thus, reducing standby time on the wireless communication device will reduce power consumption.

Figure 1:
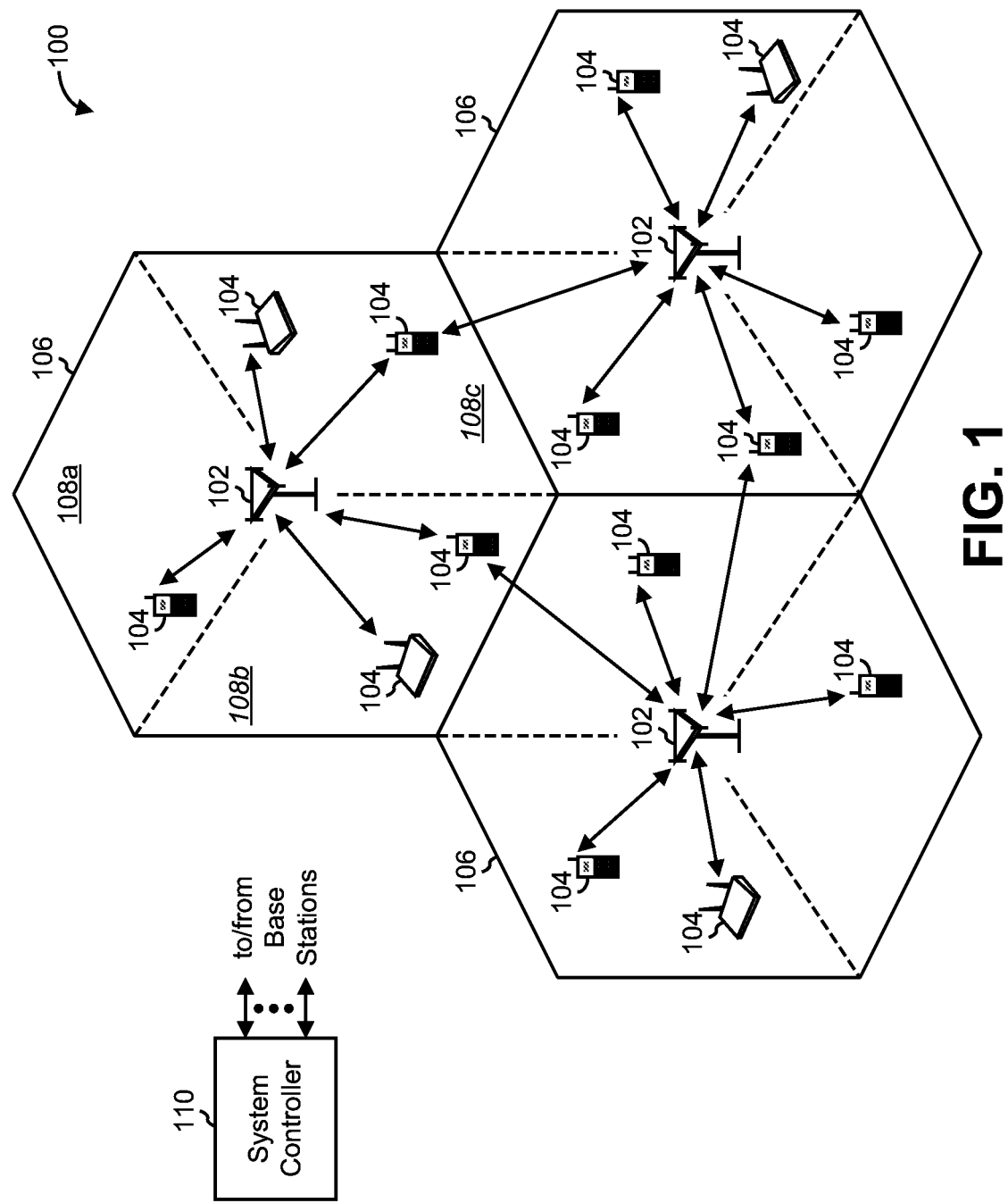
FIG. 1 shows an example of a wireless communication system in which embodiments of the present invention disclosed herein may be utilized.

FIG. 1 shows an example of a wireless communication system 100 in which embodiments of the present invention disclosed herein may be utilized. The wireless communication system 100 includes multiple base stations 102 and multiple wireless communication devices 104. The wireless communication system 100 may be designed to implement one or more CDMA standards such as CDMA2000 and wideband code division multiple access (W-CDMA) and/or some other standards. It should be appreciated that while the presents systems and embodiments of the present invention described herein relate to CDMA wireless communication system 100, embodiments of the present invention may also be practiced in other wireless communication system, such as Global System for Mobile Communications (GSM), Enhanced Data Rates for GSM Evolution (EDGE), Long Term Evolution (LTE), etc. systems.

Each base station 102 provides communication coverage for a particular geographic area 106. The term "cell" can refer to a base station 102 and/or its coverage area 106 depending on the context in which the term is used. The terms "networks" and "systems," as used herein, are often used interchangeably.

The terms "wireless communication device" and "base station" utilized in this application can generally refer to an array of components. For example, as used herein, the term "wireless communication device" refers to an electronic device that may be used for voice and/or data communication over a wireless communication system. Examples of wireless communication devices 104 include cellular phones, smart phones, personal digital assistants (PDAs), handheld devices, wireless modems, laptop computers, personal computers, and many other portable or stationary devices capable of wireless communication. A wireless communication device 104 may alternatively be referred to as an access terminal, a mobile terminal, a mobile station, a remote station, a user terminal, a terminal, a subscriber unit, a subscriber station, a mobile device, a wireless device, user equipment (UE) or some other similar terminology. A wireless communication device may be used in a wireless network and/or a roaming network.

The term "base station" can refer to a wireless communication station that is installed at a fixed location and used to communicate with wireless communication devices 104. A base station 102 may alternatively be referred to as an access point (including nano-, pico- and femto-cells), a Node B, an evolved Node B, a Home Node B or some other similar terminology. In some embodiments, base stations 102 may be mobile and can be repositioned as desired or needed for adequate network coverage.

To improve system capacity, a base station coverage area 106 may be partitioned into multiple smaller areas, e.g., three smaller areas 108a, 108b, and 108c. Each smaller area 108a, 108b, 108c may be served by a respective base transceiver station (BTS). The term "sector" can refer to a BTS and/or its coverage area 106 depending on the context in which the term is used. For a sectorized cell, the BTSs for all sectors of that cell are typically co-located within the base station 102 for the cell.

Wireless communication devices (e.g., subscriber stations) 104 are typically dispersed throughout the wireless communication system 100. A wireless communication device 104 may communicate with one or more base stations 102 on the downlink and/or uplink at any given moment. The downlink (or forward link) refers to the communication link from a base station 102 to a wireless communication device 104, and the uplink (or reverse link) refers to the communication link from a wireless communication device 104 to a base station 102. Uplink and downlink may refer to the communication link or to the carriers used for the communication link.

For a centralized architecture, a system controller 110 may couple to the base stations 102 and provide coordination and control for the base stations 102. The system controller 110 may be a single network entity or a collection of network entities. As another example, for a distributed architecture, base stations 102 may communicate with one another as needed.

Figure 2:
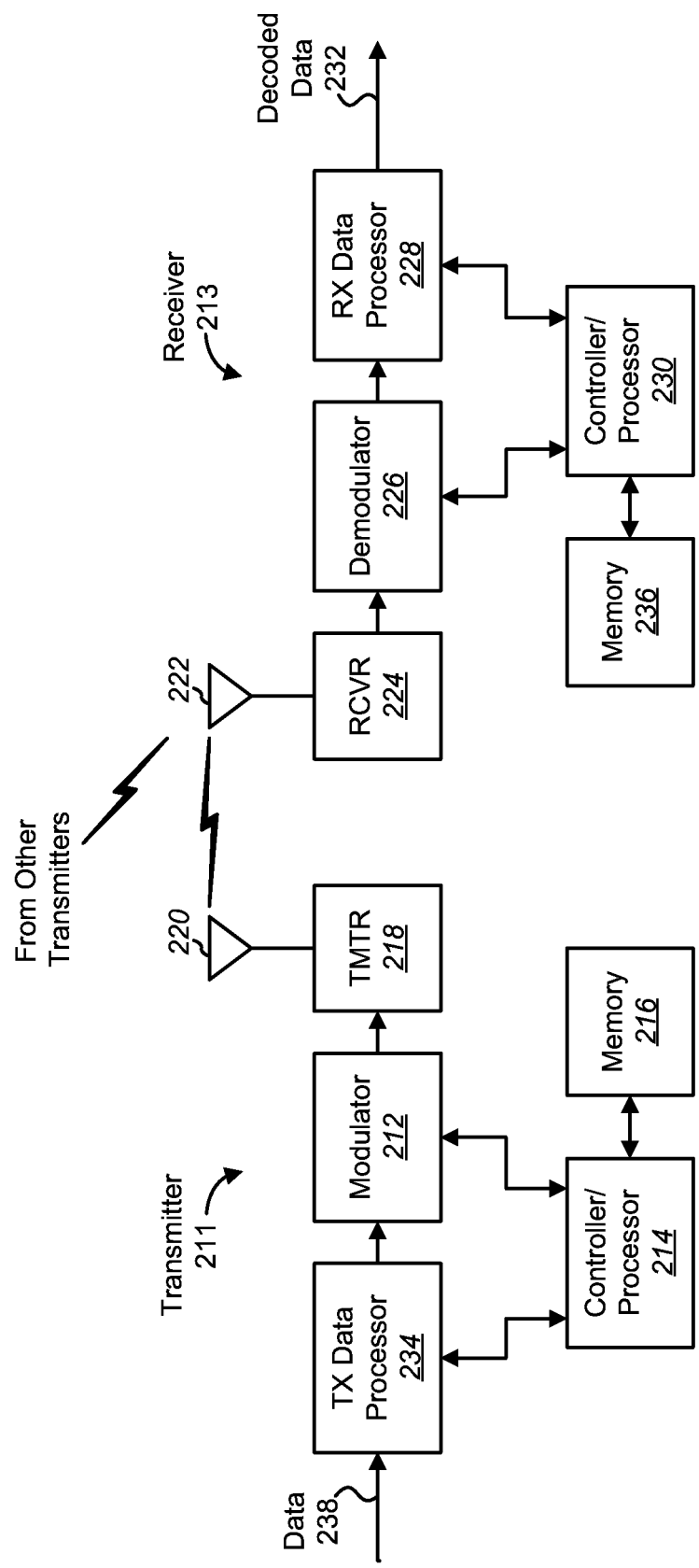
FIG. 2 shows a block diagram of a transmitter and a receiver in a wireless communication system according to some embodiments of the present invention.

FIG. 2 shows a block diagram of a transmitter 211 and a receiver 213 in a wireless communication system 100 according to some embodiments of the present invention. For the downlink, the transmitter 211 may be part of a base station 102 and the receiver 213 may be part of a wireless communication device 104. For the uplink, the transmitter 211 may be part of a wireless communication device 104 and the receiver 213 may be part of a base station 102. In some embodiments, receivers and transmitters can be combined or implemented as a transceiver.

At the transmitter 211, a transmit (TX) data processor 234 receives and processes (e.g., formats, encodes, and interleaves) data 238 and provides coded data. The transmit (TX) data processor 234 may also receive page messages from a controller 214. A modulator 212 performs modulation on the coded data and provides a modulated signal. For IS-95 and CDMA2000 systems, the processing by modulator 212 may include covering coded and pilot data with Walsh codes to channelize the user-specific data, messages and pilot data onto their respective code channels and spreading the channelized data with a pseudorandom number (PN) sequence having a particular PN offset assigned to the base station. A transmitter unit (TMTR) 218 conditions (e.g., filters, amplifies, and upconverts) the modulated signal and generates an RF modulated signal, which is transmitted via an antenna 220.

At the receiver 213, an antenna 222 receives RF modulated signals from the transmitter 211 and other transmitters. The antenna 222 provides a received RF signal to a receiver unit (RCVR) 224. The receiver unit 224 conditions (e.g., filters, amplifies, and downconverts) the received RF signal, digitizes the conditioned signal, and provides samples. A demodulator 226 processes the samples as described below and provides demodulated data. For IS-95 and CDMA2000 systems, the processing by demodulator 226 includes despreading the data samples with the same PN sequence used to spread the data at the base station, decovering the despread samples to channelize the received data and messages onto their respective code channels and coherently demodulating the channelized data with a pilot recovered from the received signal. A receive (RX) data processor 228 processes (e.g., deinterleaves and decodes) the demodulated data and provides decoded data 232. In general, the processing by demodulator 226 and RX data processor 228 is complementary to the processing by the modulator 212 and the TX data processor 234, respectively, at the transmitter 211.

Controllers/processors 214 and 230 direct operation at the transmitter 211 and receiver 213, respectively. Memories 216 and 236 store program codes in the form of computer software and data used by the transmitter 211 and receiver 213, respectively.

Figure 3:
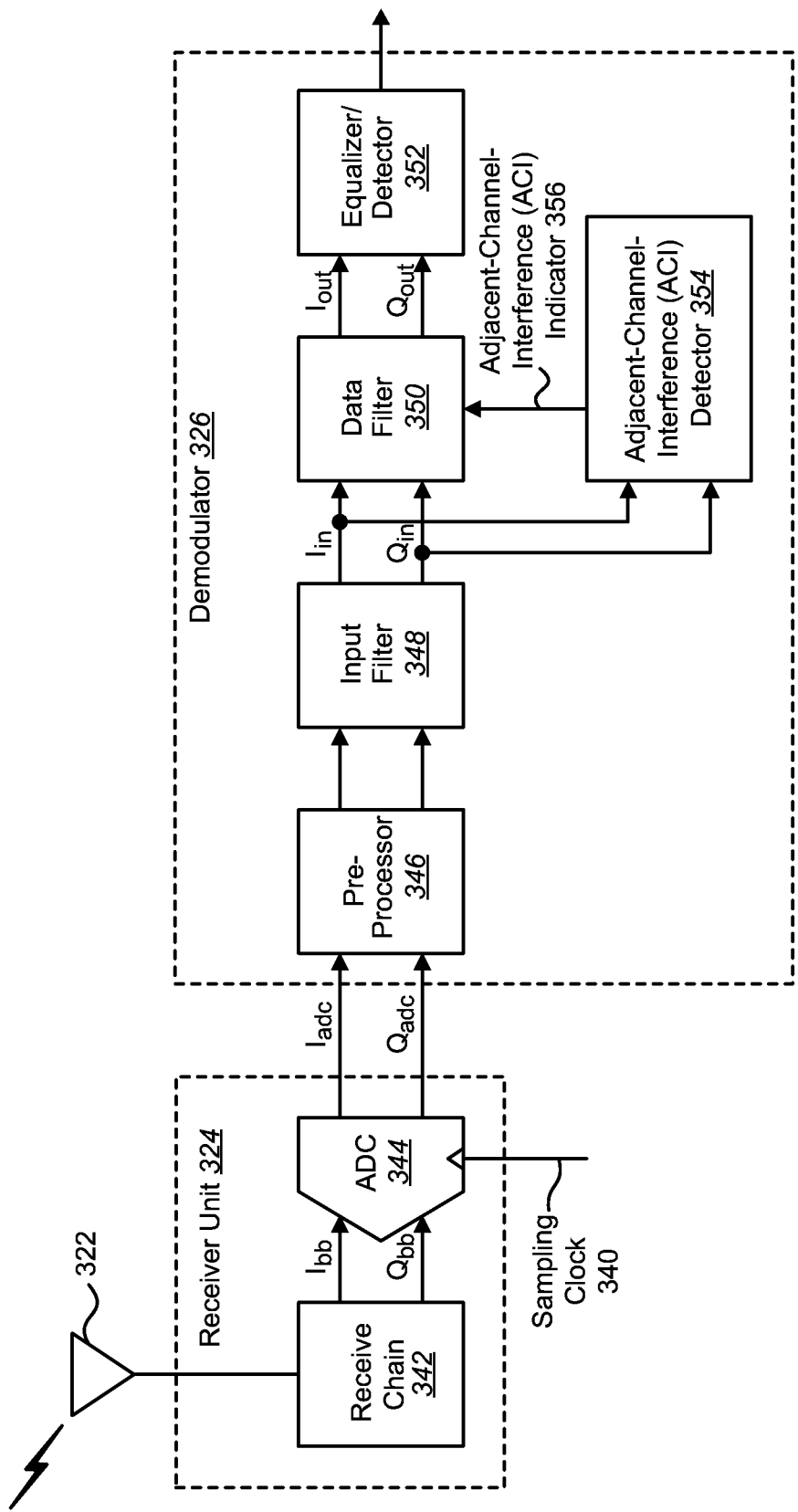
FIG. 3 shows a block diagram of a design of a receiver unit and demodulator at a receiver according to some embodiments of the present invention.

FIG. 3 shows a block diagram of a design of a receiver unit 324 and a demodulator 326 at a receiver 213 according to some embodiments of the present invention. Within the receiver unit 324, a receive chain 342 processes the received RF signal and provides I (inphase) and Q (quadrature) baseband signals, which are denoted as $I_{bb}$ and $Q_{bb}$. The receive chain 342 may perform low noise amplification, analog filtering, quadrature downconversion, etc. as desired or needed. An analog-to-digital converter (ADC) 344 digitizes the I and Q baseband signals at a sampling rate of $f_{adc}$ from a sampling clock 340 and provides I and Q samples, which are denoted as $I_{adc}$ and $Q_{adc}$. In general, the ADC sampling rate $f_{adc}$ may be related to the symbol rate $f_{sym}$ by any integer or non-integer factor.

Within the demodulator 326, a pre-processor 346 performs pre-processing on the I and Q samples from the analog-to-digital converter (ADC) 344. For example, the pre-processor 346 may remove direct current (DC) offset, remove frequency offset, etc. An input filter 348 filters the samples from the pre-processor 346 based on a particular frequency response and provides input I and Q samples, which are denoted as $I_{in}$ and $Q_{in}$. The input filter 348 may filter the I and Q samples to suppress images resulting from the sampling by the analog-to-digital converter (ADC) 344 as well as jammers. The input filter 348 may also perform sample rate conversion, e.g., from 24× oversampling down to 2× oversampling. A data filter 350 filters the input I and Q samples from the input filter 348 based on another frequency response and provides output I and Q samples, which are denoted as $I_{out}$ and $Q_{out}$. The input filter 348 and the data filter 350 may be implemented with finite impulse response (FIR) filters, infinite impulse response (IIR) filters or filters of other types. The frequency responses of the input filter 348 and the data filter 350 may be selected to achieve good performance. In one design, the frequency response of the input filter 348 is fixed and the frequency response of the data filter 350 is configurable.

An adjacent-channel-interference (ACI) detector 354 receives the input I and Q samples from the input filter 348, detects for adjacent-channel-interference (ACI) in the received RF signal and provides an adjacent-channel-interference (ACI) indicator 356 to the data filter 350. The adjacent-channel-interference (ACI) indicator 356 may indicate whether or not adjacent-channel-interference (ACI) is present and, if present, whether the adjacent-channel-interference (ACI) is due to the higher RF channel centered at +200 kilohertz (kHz) and/or the lower RF channel centered at −200 kHz. The frequency response of the data filter 350 may be adjusted based on the adjacent-channel-interference (ACI) indicator 356, to achieve desirable performance.

An equalizer/detector 352 receives the output I and Q samples from the data filter 350 and performs equalization, matched filtering, detection and/or other processing on these samples. For example, the equalizer/detector 352 may implement a maximum likelihood sequence estimator (MLSE) that determines a sequence of symbols that is most likely to have been transmitted given a sequence of I and Q samples and a channel estimate.

Figure 4:
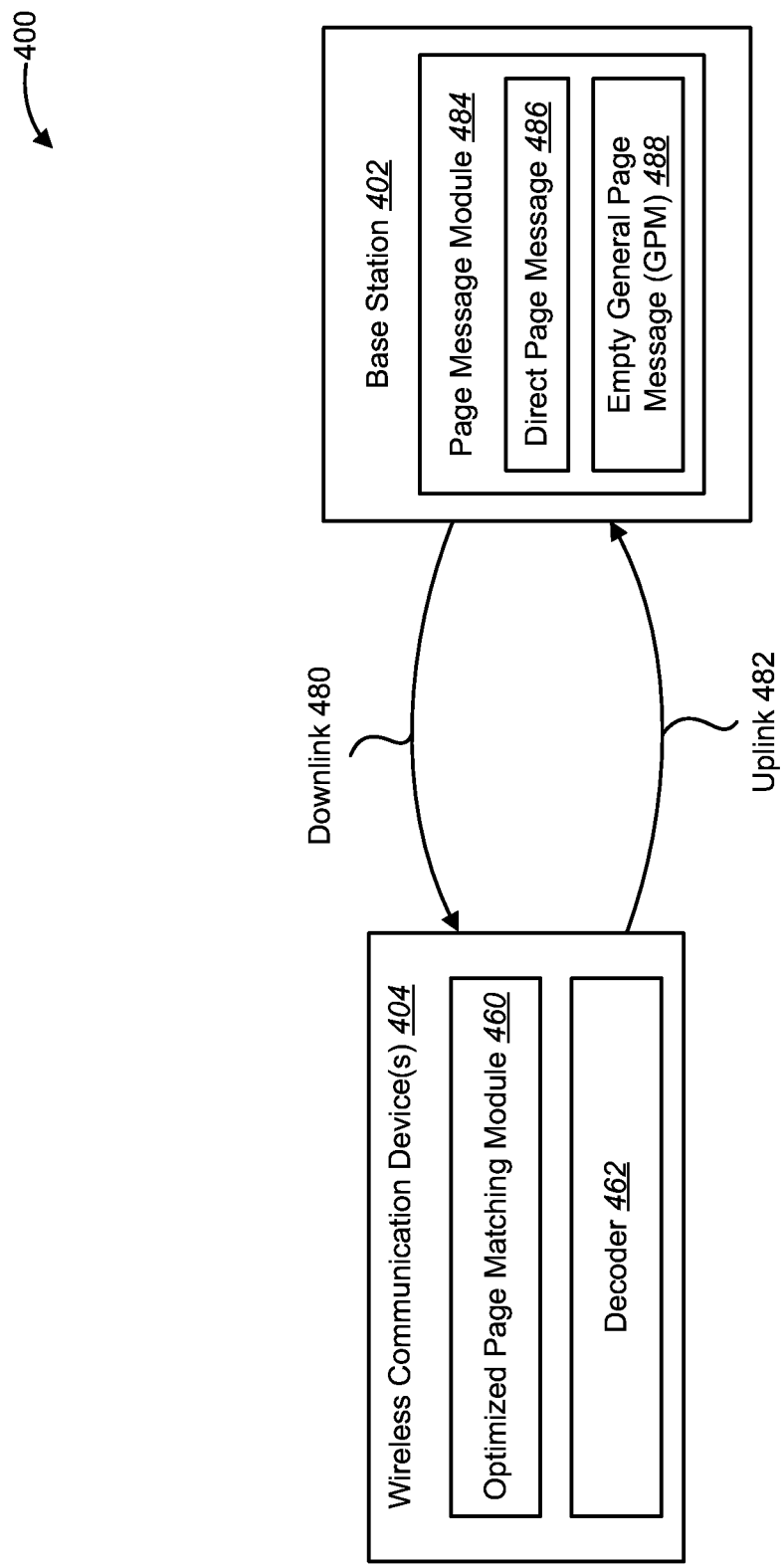
FIG. 4 shows a wireless communication system with multiple wireless devices in which embodiments of the present invention disclosed herein may be utilized.

FIG. 4 shows a wireless communication system 400 with multiple wireless devices in which embodiments of the present invention disclosed herein may be utilized. The wireless communication system 400 of FIG. 4 may be one example of the wireless communication system 100 described above in connection with FIG. 1. For example, the base station 402 and wireless communication device 404 of FIG. 4 may correspond to the base station 102 and wireless communication device 104 of FIG. 1, respectively.

Communications in the wireless communications system 400 (e.g., a multiple-access system) may be achieved through transmissions over one or more wireless links, such as a downlink 480 or an uplink 482. The communication link may be established via a single-input and single-output (SISO), multiple-input and single-output (MISO), or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The wireless communication system may utilize MIMO. A MIMO system may support both time division duplex (TDD) and frequency division duplex (FDD) systems. In a TDD system, downlink 480 and uplink 482 transmissions are on the same frequency region so that the reciprocity principle allows the estimation of the downlink channel from the uplink channel. This enables a transmitting wireless device to extract transmit beamforming gain from communications received by the transmitting wireless device.

The wireless communication system 400 may be a multiple-access system capable of supporting communication with multiple wireless communication devices 404 by sharing available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, 3rd Generation Partnership Project (3GPP) Long Term Evolution (LTE) systems, and spatial division multiple access (SDMA) systems.

A wireless communication device 404 may communicate with zero, one, or multiple base stations 402 on the downlink 480 and/or uplink 482 at any given moment. As described above, the downlink 480 (or forward link) refers to the communication link from a base station 402 to a wireless communication device 404 and the uplink 482 (or reverse link) refers to the communication link from a wireless communication device 404 to a base station 402.

A wireless communication device 404 may operate in several modes or states, such as active mode, standby mode, and inactive mode. In active mode, the wireless communication device can actively process and exchange data with one or more base stations 402 (e.g., voice or data). In standby mode (i.e., idle mode), the wireless communication device 404 may monitor a paging channel for messages, such as general page messages (GPM) or direct messages addressed to the wireless communication device 404. In inactive or sleep mode, the wireless communication device 404 reduces power consumption by powering down as much circuitry as possible. In other words, in sleep mode, the wireless communication device 404 does not monitor the paging channel or perform access procedures.

The power consumption by the wireless communication device 404 in the standby mode decreases the available battery resources, which then shortens the time between battery recharges. Power consumption in the standby mode is typically many times greater than that in the inactive mode. Any reduction in the amount of time spent in the standby mode may result in a direct and significant improvement in overall battery life of the wireless communication device 404. Therefore, it is desirable to minimize the wireless communication device's 404 power consumption in the standby mode to increase battery life. Power efficiency and conservation also becomes increasingly important as wireless communication devices become more feature rich.

To reduce power consumption in standby mode, messages on the paging channel may be sent to a wireless communication device 404 at designated times. For example, in CDMA2000 systems, the paging channel is divided into numbered "slots" (i.e., a slotted paging channel). Each slot may correlate to a slot cycle index (SCI).

The base stations 402 may assign one or more slots to the wireless communication device 404 to receive page messages. For example, under the IS-2000 standard, the paging channel is partitioned into two paging channel slots, each having a 80 millisecond (msec) duration. Each paging channel slot is further partitioned into four 20 msec frames or sub-slots. A group of wireless communication devices 404 may be assigned to each paging channel slot. The paging channel may include other slots. For example, multicast and/or broadcast messages may be sent over the paging channel. However, as used herein, the paging channel, and paging channel slotted mode refers to a wireless communication device 404 monitoring the paging channel for direct page message and/or an empty general page message (GPM).

In a slotted paging channel, the wireless communication device 404 periodically, rather than continuously, monitors the paging channel for messages from the base station 402. In other words, the wireless communication device 404 may wake-up at certain slots (corresponding to the slot cycle index (SCI) assigned to the wireless communication device) to decode page messages. The wireless communication device 404 wakes up from inactive mode prior to its assigned slot or sub-slot, switches into standby mode to detect the page message and enters active mode to processes the paging channel for messages.

Once the page message is received the wireless communication device 404 may perform a page matching algorithm to determine is the page message is directed towards the wireless communication device 404 or not. If the page message is not directed towards the wireless communication device 404, the wireless communication device 404 may revert back to inactive mode. In other words, the base station 402 is not transmitting additional communication for the wireless communication device 404 to process. In this manner, power is conserved by reducing standby mode time.

If the base station 402 is transmitting additional communication for the wireless communication device 404 to process or is not page message is received, the wireless communication device 404 may remain in the active or awake state. For example, the page matching algorithm may detect that the page message is directed towards the wireless communication device 404. When not in a standby or active state, the wireless communication device 404 reverts back to inactive mode.

In current CDMA2000 systems, the wireless communication device 404 remains in standby mode for the entire duration of the sub-slot before performing the page matching algorithm. For example, the wireless communication device 404 waits 20 msec for the sub-slot to pass before performing the page matching algorithm. Because the wireless communication device 404 may receive the page message before the sub-slot has passed, benefits may be realized by performing the page matching algorithm before the sub-slot has passed. In this manner, the wireless communication device 404 may determine that the page message is not directed towards the wireless communication device 404 and may enter sleep mode sooner. For example, the wireless communication device 404 and may enter sleep mode before the entire time allotted for the sub-slot has passed.

In some known configurations, page matching is not performed until after the page message is completely received. For example, the page matching module may not start page matching until the sub-slot boundary following the sub-slot for which the page message was received. This approach may be problematic because the wireless communication device 404 remains in standby mode for longer than necessary, wasting power and other resources.

In a slotted mode optimal network, a base station may 402 send a page message to the wireless communication device 404 during the first sub-slot. This allows the wireless communication device 404 to enter sleep mode shortly after the page message is received. In this way, the time spent in inactive mode is increased because the wireless communication device 404 will not be continuously searching for page messages in standby mode. However, even in a slotted mode optimal, the wireless communication device 404 may remain awake for the entire duration of the first sub-slot before returning to sleep mode.

In some configurations, after matching an empty general page message (GPM) and entering sleep mode, the wireless communication device 404 may remain in sleep mode until the next full-slot begins. Thus, if the wireless communication device 404 enters into sleep mode before the first sub-slot has fully elapsed, the wireless communication device 404 may continue to remain in sleep mode for the second sub-slot, third sub-slot, and fourth sub-slot.

In other configurations, the wireless communication device 404 may return from sleep mode after one or more subsequent sub-slots have passed. For example, the wireless communication device 404 may enter into sleep mode in the first sub-slot and return to standby mode in the third sub-slot. In this manner, the wireless communication device 404 may switch into standby mode to monitor incoming page messages for any sub-slot.

In a non-optimal network, the base station 402 may send the wireless communication device 404 a page message during a later sub-slot. A base station 402 may send a page message at a later sub-slot to ensure that all wireless communication devices 404 receive the page messages. For instance, a wireless communication device 404 may not be prepared to receive the page message in the first sub-slot, which may cause it to remain it standby mode until the next first sub-slot in the next full slot.

However, this approach is inefficient because it causes wireless communication devices 404 remain in standby mode for longer periods than necessary. Thus, when the base station 402 sends a page message to a wireless communication device 404 later than during the first sub-slot, the wireless communication device 404 will remain in standby mode for additional sub-slots for which no information is being received or decoded. For example, if the base station 402 sends the wireless communication device 404 a page message in the eighth sub-slot, the wireless communication device 404 may remain in standby mode unnecessarily for the first seven sub-slots (i.e., 140 msec).

In non-optimized networks, power savings may be achieved by detecting a page message and entering sleep mode before the sub-slot in which the page message is received has passed. While power savings in non-optimized networks may not be as great as in an optimized network, the embodiments of the present invention described herein may still result in power savings in a non-optimized network.

In another configuration, a wireless communication device 404 may employ a quick paging channel (QPCH). A QPCH is a separate channel from the paging channel. The QPCH does not receive page messages, but rather is used to detect bits that inform the wireless communication device 404 whether to switch from inactive mode to standby mode to receive a page message on the paging channel.

The QPCH is used in conjunction with the paging channel and functions like a control channel for the paging channel. Each QPCH slot is associated with a corresponding paging channel slot, but is transmitted before the associated paging channel slot. For example, slot 2 of the QPCH slot is transmitted 100 milliseconds (msec) before sub-slot 2 of the paging channel. A paging indicator bit, or bits, on the QPCH alerts the wireless communication device 404 that a coded page message is about to be transmitted on the paging channel in the associated paging channel slot. However, the QPCH may fail to receive or decode the paging indication bit(s). In this case, the page message sent to the paging channel will also fail to be received and decoded by the wireless communication device 404.

The QPCH may also send false alarms to the wireless communication device 404. In the case of a false alarm, the QPCH informs the wireless communication device 404 that a page message is to be received in the next slot when no page message is present. This causes the wireless communication device 404 to waste power by operating in standby mode when no page messages are being received.

As stated previously, the base station 402 may send a page message to the wireless communication device 404. The page message may be a direct page message 486 or a general page message (GPM). In some instances, the general page message (GPM) may be an empty general page message (GPM) 488. Additionally or alternatively, the direct page message 486 may also be a general page message (GPM).

The base station 402 may include a page message module 484 that generates and sends a direct page message 486 and/or an empty general page message (GPM) 488 to the wireless communication device 404. The wireless communication device 404 may also detect the direct page message 486 and/or the empty general page message (GPM) 488. The wireless communication device 404 may also detect data for the next message that is not required for the page matching algorithm.

Direct page messages 486 may alert the wireless communication device 404 to the presence of incoming call system update parameters (e.g., overhead messages). If the wireless communication device 404 detects a direct page message 486, the wireless communication device 404 may perform access procedures. Access procedures may require the wireless communication device 404 to remain in the awake state to process data.

An empty general page message (GPM) 488 may indicate that all the direct page messages 486 have been sent by the base station 402 or that no more direct page messages 486 will be sent to the wireless communication device 404 for the slot cycle. If the wireless communication device 404 detects an empty general page message (GPM) 488, the wireless communication device 404 may immediately go to sleep (e.g., inactive mode) instead of waiting for further page messages.

The wireless communication device 404 may include an optimized page matching module 460 and a decoder 462. When the wireless communication device 404 is in paging channel (PCH) slotted mode, the wireless communication device 404 may wake-up at certain slots (corresponding to the slot cycle index (SCI) assigned to the wireless communication device 404) to decode direct page messages 486.

The decoder 462 may decode page messages. The page message may be received as page message bits and the decoder 462 may start decoding page message bits upon arrival of the page message bits. The decoded page message may be sent to the optimized page matching module 460.

The optimized page matching module 460 may receive the decoded page messages. The decoder 462 may send page messages bits as they are decoded. In other words, the page message may be received in one or more portions.

According to embodiments of the present invention, the optimized page matching module 460 may employ a quick page matching algorithm (i.e., perform a quick page message match). When employing the quick page matching algorithm, the wireless communication device 404 may switch to active mode. The quick page message match compares at least a portion of the received page message to determine if the page message is a direct page message 486, data for the next message or an empty general page message (GPM) 488. If the page message is a direct page message 486 or data for the next message, the wireless communication device 404 remains in active mode for further processing. If the page message is an empty general page message (GPM) 488, the wireless communication device 404 switches to sleep mode immediately (instead of waiting until the end of the sub-slot). In some instances, the optimized page matching module 460 may detect data for the next message by determining that the page message is neither a direct page message 486 nor an empty general page message (GPM) 488.

The optimized page matching module 460 may perform a quick page message match before waiting for the entire page message to be received. For example, rather than waiting 20 msec for the sub-slot for which the page message is received to pass, the optimized page matching module 460 may perform the page message match sooner, such as at 7.5 msec, 10 msec, 12 msec, 15, msec, etc. In CDMA2000, an empty general page message (GPM) 488 is 9 bytes (i.e. 72 bits) and takes 7.5 msec to be received. In other radio technologies, an empty general page message (GPM) 488 or similar type of page message may likewise take less than the full sub-slot time allotted to receive the page message. In some instances, the optimized page matching module 460 may perform the quick page message match while the reminder of the page message is being received.

The optimized page matching module 460 may increase sleep time by allowing the wireless communication device 404 to enter into sleep mode in the same sub-slot (i.e., before the end of the sub-slot) for which the page message is being received. In this manner, the amount of time the wireless communication device 404 is in standby mode is decreased. Optimized page matching may be implemented with software changes in 1xLayer1.

As per the CDMA2000 standard, in slotted mode, each sub-slot is 20 msec in duration and may receive up to 192 bits (i.e. 24 bytes). A base station 402 may send out an empty general page message (GPM) 488 (with a length of 9 bytes) in the first 7.5 msec of the 20 msec sub-slot for full rate paging channel scenarios. The decoder 462 on the wireless communication device 404 may decode an empty general page message (GPM) 488. By waiting until the end of the 20 msec sub-slot before performing a page match, the wireless communication device 404 is awake for an extra 12.5 msec (as compared to being awake for only 7.5 msec if a page match is performed at the end of the empty general page message (GPM) 488). Therefore, if the wireless communication device 404 can determine earlier that an empty general page message (GPM) 488 is being sent, the wireless communication device 404 may return to sleep mode earlier, reducing the power consumption of the wireless communication device 404 and increasing standby time.

For example, under the CDMA2000 standard, in slotted mode, a wireless communication device 404 with the optimized page matching module 460 may extract the page message and perform a quick empty page matching procedure at 10 msec to determine whether the page message is an empty general page message (GPM) 488. If the page message is determined to be an empty general page message (GPM) 488, the wireless communication device 404 may return to sleep mode, saving 10 msec worth of operating power and reducing the awake time. The optimized page matching module 460 may also perform offline processing on the page message. In some instances, offline processing includes quick page matching and/or extracting the entire page message.

Figure 5:
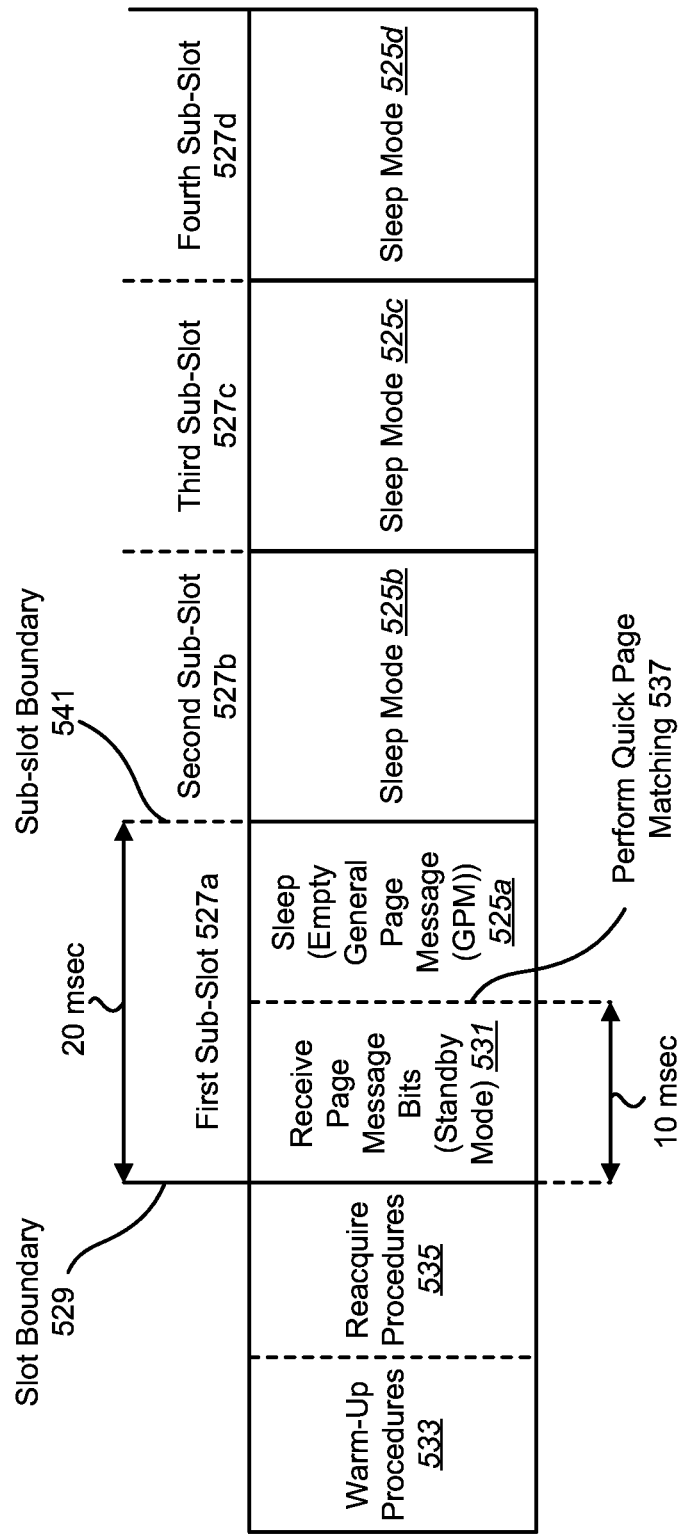
FIG. 5 shows a timing diagram of the optimized page matching mode of a wireless communication device in an optimal network according to some embodiments of the present invention.

FIG. 5 shows a timing diagram of the optimized page matching mode of a wireless communication device 104 in an optimal network according to some embodiments of the present invention. The timing diagram includes a slot of a paging channel separated into four sub-slots 527a-d or frames. The sub-slots 527a-d may be divided by sub-slot boundaries 541 with slot boundaries 529. For simplicity, only one slot boundary 529 and sub-slot boundary 541 is labeled.

In some configurations, the sub-slots 527a-d may be 20 millisecond (msec) in duration and may combine to from one of the two 80 msec partitioned paging channel slots, as defined under the IS-2000 standard. Additionally, the sub-slot 527a-d may correlate to a slot cycle index (SCI).

In a slotted mode optimal network, the base station 102 sends page messages in the first sub-slot 527a in over-the-air (OTA) transmissions. Prior to the slot boundary 529 of a slot corresponding to the slot cycle index (SCI) assigned to the wireless communication devices 104, the wireless communication device 104 may wake-up (e.g., switch from sleep mode into standby mode) in time to perform warm-up procedures 533 and reacquire procedures 535. Reacquire procedures 535 may include synchronizing with the base station 102, aligning with the base station 102, determining which base station 102 is optimal, etc.

The wireless communication device 104 may receive 531 page message bits during the first sub-slot 527a. It is assumed for this example that the base station 102 is sending the page message during the first sub-slot 527a in an optimal network. If the base station 102 does not send the page message in the first sub-slot 527a, the wireless communication device 104 may remain awake until either the page message is received 531 or the eighth sub-slot (not shown) is completed.

The wireless communication device 104 may start performing quick page matching 537 before the first sub-slot 527a has fully completed. The decoder 462 may take 7.5 msec to receive and decode an empty general page message (GPM) 488. For example, the empty general page message (GPM) 488 may be 9 byte and the decoder 462 may receive and decode 9600 bits per second (e.g., as in full rate paging channel scenarios).

The decoder 462 may pass the decoded message bits to the optimized page matching module 460. For example, the optimized page matching module 460 may obtain the decoded message bits for a decoder buffer. Because the decoder 462 may need only 7.5 msec to decode an empty general page message (GPM) 488, page matching may begin thereafter. For example, quick page matching may be performed at 10 msec from the start of the first sub-slot 527a. In this manner, the wireless communication device 104 does not have to wait for the sub-slot boundary 541 to perform the page match. As a result, the wireless communication device 104 may enter sleep mode 525 10 msec sooner if the page matching detects an empty general page message (GPM) 488. The wireless communication device 104 may remain in sleep mode 525b-d for the remainder of the slot cycle.

In some configurations, the layer-1 software of the wireless communication device 104 may look at the decoder buffer after the 10 msec and do offline processing on the decoder buffer bits to determine whether an empty general page message (GPM) 488 was received (e.g., quick page matching). If the page message is an empty general page message (GPM) 488, the wireless communication device 104 may enter sleep mode 525a immediately (e.g., in the first sub-slot 527a). Thus, power is conserved by not remaining in standby mode for an additional 10 msec. If the page message is a direct page message 486, the wireless communication device 104 may perform access procedures (not shown).

Table 1 below gives examples of the improvement achievable in standby time using optimized page matching. From the table, the use of optimized page matching may increase standby time by 33%.

TABLE 1

| Base Station Transmitted Paging Channel (PCH) Frame Rate/Duration | Wireless Communication Device Awake Time per Slot Cycle Index (SCI) (Non-Optimized Page Matching) | Wireless Communication Device Awake Time per Slot Cycle Index (SCI) (Optimized Page Matching) | Improvements in Standby Time |
|---|---|---|---|
| 9600 bps/20 ms | 40 ms | 30 ms | 33% |

The use of optimized page matching may be more beneficial for all networks (e.g., optimal and non-optimal networks) during non-peak hours. The use of optimized page matching may also be more beneficial for remote areas and less-loaded networks during peak hours. Optimized page matching may be implementable with software changes in 1xLayer1. For low end chipsets, increases in standby time may be very beneficial. For example, optimized page matching may be useful in dual SIM dual standby (DSDS). In dual SIM dual standby (DSDS), a wireless communication device 104 has two SIM cards. A wireless communication device 104 that uses dual SIM dual standby (DSDS) may be any wireless communication device 104 that is capable of communicating using more than one radio access technology (RAT).

Multiple SIM technology, such as Dual SIM dual standby (DSDS), is a popular feature in China, India, South East Asia, Latin America and other markets. To be competitive in markets utilizing dual SIM dual standby (DSDS), a wireless communication device 104 may need to have optimal power consumption and lower hardware cost. For example, a wireless communication device 104 that has higher power consumption and a dual receiver may be unable to compete in a dual SIM dual standby (DSDS) market. Thus, reducing the hardware cost and power consumption of a dual SIM dual standby (DSDS) wireless communication device 104 is desirable.

Additionally, the optimized page matching module 460 may reduce the standby time of one subscription in slotted mode. In this manner, the optimized wake-up module may reduce the conflicts between dual subscriptions wakeup in Dual SIM Dual Standby (DSDS) devices (or any device containing multiple SIMs).

It should be noted that the timing diagram of FIG. 5 illustrates the timing for a page message received via the paging channel and not data or bits received on the quick paging channel (QPCH). The wireless communication device 104 described herein monitors the paging channel, not the quick paging channel (QPCH). In other words, the page message is not received via a quick paging channel (QPCH). The embodiments of the present invention described herein may work with or without the presence of a quick paging channel (QPCH). In the case of a quick paging channel (QPCH), the quick paging channel (QPCH) may fail or miss a page indicator bit indicating a forthcoming page message.

Figure 6:
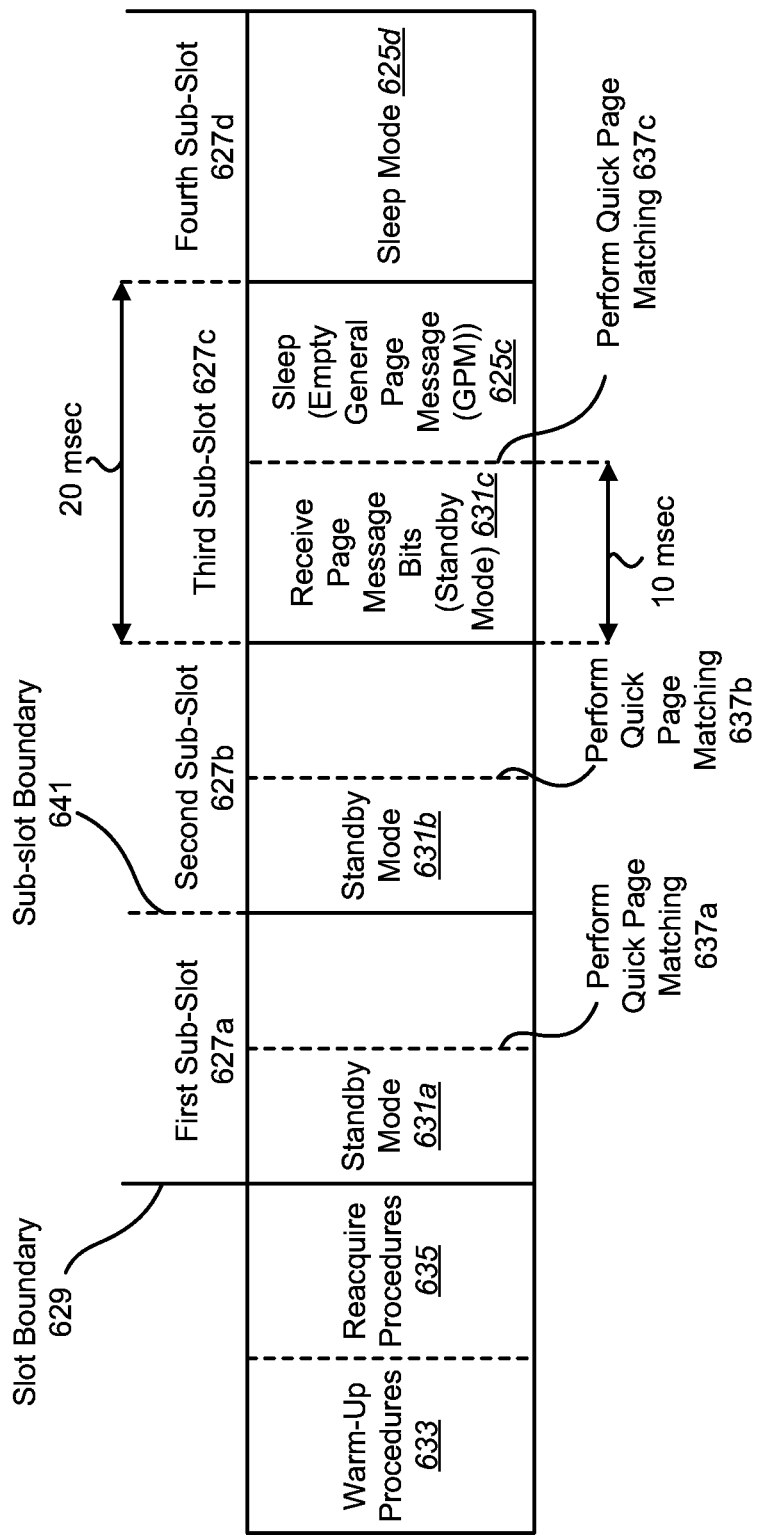
FIG. 6 shows a timing diagram of the optimized page matching mode of a wireless communication device in a non-optimal network according to some embodiments of the present invention.

FIG. 6 shows a timing diagram of the optimized page matching mode of a wireless communication device 104 in a non-optimal network according to some embodiments of the present invention. The timing diagram of FIG. 6 may include slot boundaries 629, sub-slot boundaries 641, sub-slots 627a-d, warm-up procedures 633, reacquire procedures 635, and decode page message procedures 637 similar to corresponding elements 529, 541, 527a-d, 533, 535 and 537 described above in connection with FIG. 5. The sub-slot 627a-d may correlate to a slot cycle index (SCI).

In a slotted mode non-optimal network, the base station 102 does not send page messages in the first sub-slot 627a in over-the-air (OTA) transmissions. Prior to the slot boundary 629 of a slot corresponding to the slot cycle index (SCI) assigned to the wireless communication devices 104, the wireless communication device 104 may wake-up (e.g., switch from sleep mode into standby mode) in time to perform warm-up procedures 633 and reacquire procedures 635.

In slotted mode non-optimal networks, the base station 102 may not transmit either the empty general page message (GPM) 488 or the direct page message 486 in the first sub-slot 627a of the slot corresponding to the slot cycle index (SCI) assigned to the wireless communication device 104. However, optimized page matching may be extended to non-optimal networks.

The base station 102 may send over the air (OTA) (not shown) transmissions to the wireless communication device 104 during the first sub-slot 627a and the second sub-slot 627b of the slot corresponding to the slot cycle index (SCI). These over the air (OTA) message bits may be repetitive information that the wireless communication device 104 already has and does not need again. The base station 102 may not transmit the empty general page message (GPM) 488 until a slot later than the first sub-slot 627a (the third sub-slot 627c in this example).

At the slot boundary 629, the wireless communication device 104 may receive message bits over the first sub-slot 627a. Before the end of the first sub-slot 627a, the wireless communication device 104 may perform quick page matching 637a. For example, quick page matching may be performed 10 msec into the first sub-slot 627a. At this point, the wireless communication device 104 may perform quick page matching 637a on the received message bits. Because an empty general page message (GPM) 488 or a direct page message 486 was not detected, the wireless communication device 104 may remain in standby mode 631a for the remainder of the first sub-slot 627a.

A wireless communication device 104 without an optimized page matching module 460 may wait until the end of the first sub-slot 627a before performing page matching. However, it would also fail to detect an empty general page message (GPM) 488 or a direct page message 486 and revert back to standby mode.

If the base station 102 does not send an empty general page message (GPM) 488 or a direct page message 486 in the second sub-slot 627b, the wireless communication device 104 may again enter standby mode 631b before the end the second sub-slot 627b. Similar to the first sub-slot 627a, the wireless communication device 104 may perform quick page matching 637b before the end of the second sub-slot 627b, but fail to detect an empty general page message (GPM) 488 or a direct page message 486.

In a non-optimized network, the base station 102 may send an empty general page message (GPM) 488 in the third sub-slot 627c. The wireless communication device 104 may receive 631c the page message during the third sub-slot 627c. The wireless communication device 104 may start performing quick page matching 637c before the third sub-slot 527c has passed. For example, quick page matching may be performed at 10 msec from the start of the third sub-slot 627c. In this manner, the wireless communication device 104 does not have to wait for the end of the third sub-slot 627c to perform the page match. As a result, the wireless communication device 104 may enter sleep mode 625c 10 msec sooner if the page matching detects an empty general page message (GPM) 488. The wireless communication device 104 may remain in sleep mode 625 for the remainder of the slot cycle. In this manner, the batter life of the wireless communication device 104 may be extended.

A wireless communication device without an optimized page matching module 460 may wait until the end of the third sub-slot 627c before performing page matching. In this manner, the non-optimized wireless communication device may remain in standby mode 631 consuming power for unnecessary amounts of time. For example, the non-optimized wireless communication device may remain in standby mode 631 10 msec longer than a wireless communication device 104 with optimized page matching.

The use of optimized page matching in a non-optimal network may not provide as much benefit as the use of optimized page matching in an optimal network. In a non-optimal network, the benefit may be increased by decreasing the sub-slots 627 that the base station 102 transmits on. For example, a non-optimized network that transmits in the second sub-slot 627b will allow the wireless communication device 104 to conserve more power than a non-optimized network that transmits in the third sub-slot 627c.

Figure 7:
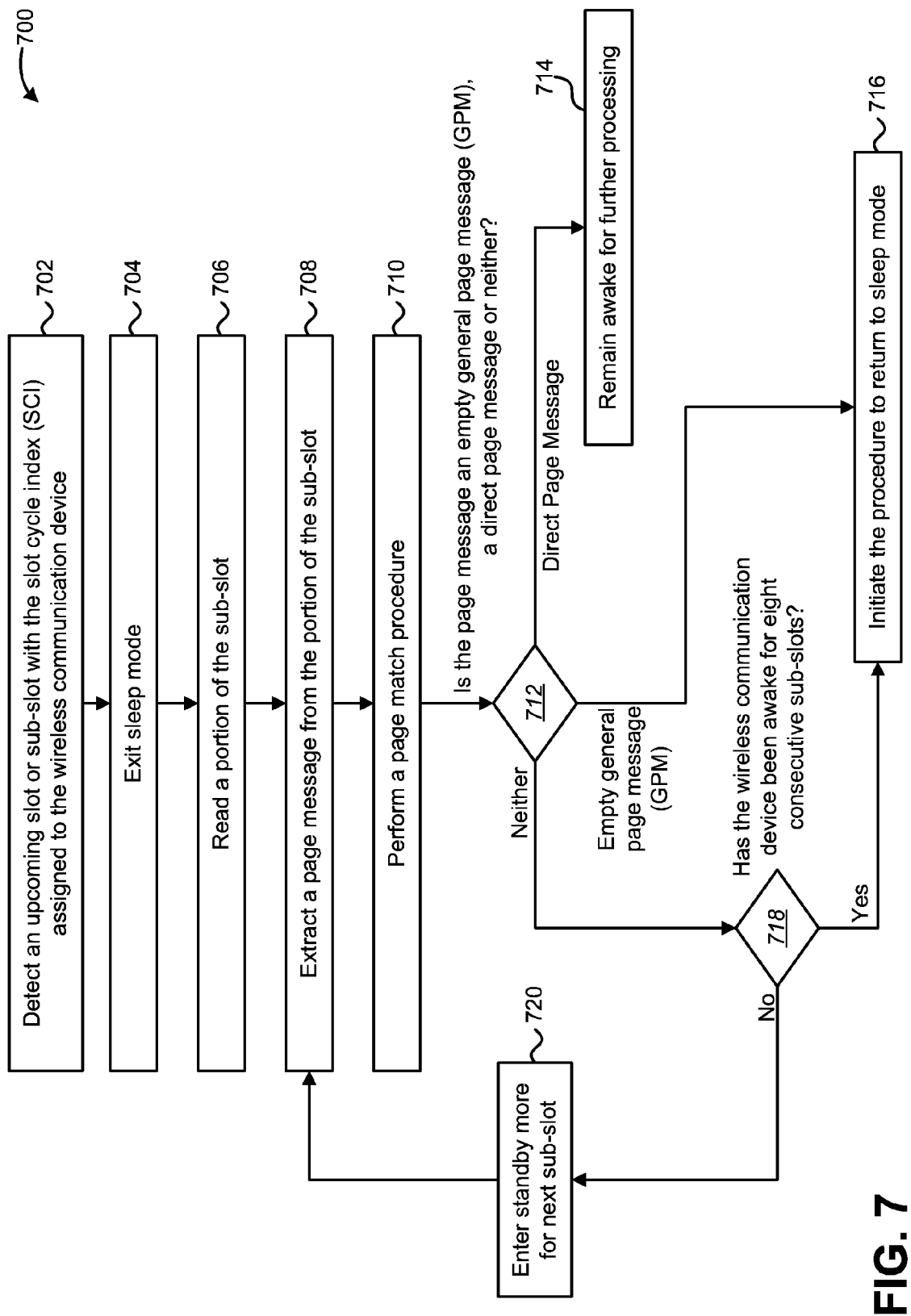
FIG. 7 is a flow diagram of a method for optimized page matching.

FIG. 7 is a flow diagram of a method 700 for optimized page matching. The method may be performed by a wireless communication device 104. The wireless communication device 104 may include an optimized page match module 460. The wireless communication device 104 may operate in either an optimal network or a non-optimal network.

The wireless communication device 104 may detect 702 an upcoming slot or sub-slot 527 corresponding to the slot cycle index (SCI) assigned to the wireless communication device 104. The wireless communication device 104 may exit 704 sleep mode (e.g., switch into standby mode). The wireless communication device 104 may then read 706 a portion of the sub-slot 527. For example, in an optimized network, the sub-slot 527 may be the first sub-slot 527a. In a non-optimized network, the sub-slot 627 may be the third sub-slot 627c.

The wireless communication device 104 may extract 708 a page message from the portion of the sub-slot 527a. The wireless communication device 104 may then perform 710 a page matching procedure. For example, the page matching procedure may be a quick page match performed by the optimized page matching module 460.

The wireless communication device 104 device may determine 712 whether the page message is an empty general page message (GPM) 488, direct page message 486 or neither. If the page message is a direct page message 486, the wireless communication device 104 may remain 714 awake for further processing, such as to read the message. For example, the wireless communication device 104 may switch from standby mode 531 to awake mode to process the page message.

If the page message is an empty general page message (GPM) 488, the wireless communication device 104 may initiate 716 the procedure to return to sleep mode 525. In some configurations, such as in CDMA2000, this may start occurring 10 msec into the sub-slot 527 rather than at a sub-slot boundary 541.

If the page message is neither an empty general page message (GPM) 488 nor a direct page message 486, the wireless communication device 104 may determine 718 whether the wireless communication device 104 has been awake for eight consecutive sub-slots 527. If the wireless communication device 104 has been awake for eight consecutive sub-slots 527, the wireless communication device 104 may initiate 716 the procedure to return to sleep mode 525.

If the wireless communication device 104 has not been awake for eight consecutive sub-slots 527, the wireless communication device 104 may enter 720 standby mode 531. During standby mode 531, the wireless communication device 104 may receive and read a portion of the next sub-slot 527. The wireless communication device 104 may then extract 708 a page message from the portion of the sub-slot 527 and the method 700 may continue as previously described.

Figure 8:
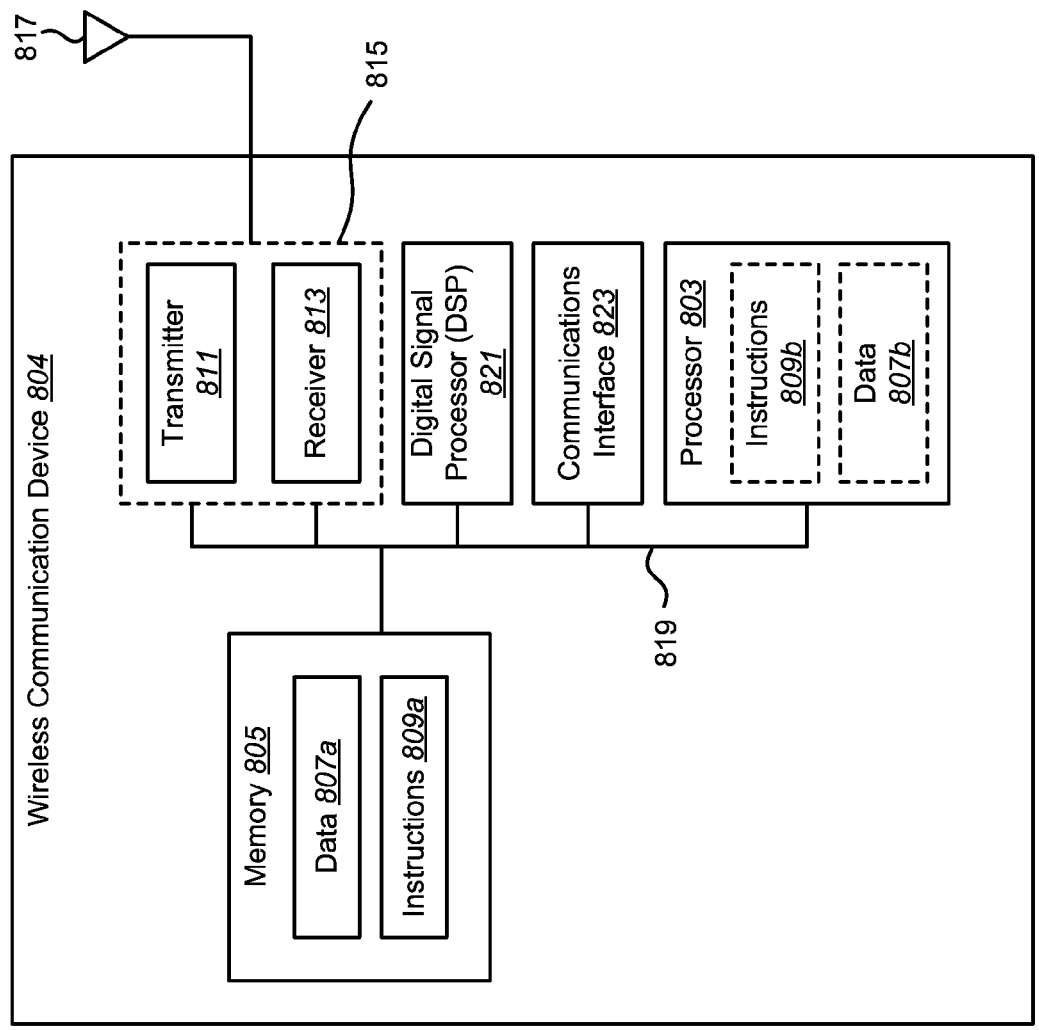
FIG. 8 shows certain components that may be included within a wireless communication device according to some embodiments of the present invention.

FIG. 8 shows certain components that may be included within a wireless communication device 804 according to some embodiments of the present invention. The wireless communication device 804 may be an access terminal, a mobile station, a user equipment (UE), etc. The wireless communication device 804 includes a processor 803. For example the wireless communication device 804 may be the wireless communication device 104 of FIG. 1 and/or the wireless communication device 404 of FIG. 4.

The processor 803 may be a general purpose single- or multi-chip microprocessor (e.g., an ARM), a special purpose microprocessor (e.g., a digital signal processor (DSP)), a microcontroller, a programmable gate array, etc. The processor 803 may be referred to as a central processing unit (CPU). Although just a single processor 803 is shown in the wireless communication device 804 of FIG. 8, in an alternative configuration, a combination of processors (e.g., an ARM and DSP) could be used.

The wireless communication device 804 also includes memory 805. The memory 805 may be any electronic component capable of storing electronic information. The memory 805 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 807a and instructions 809a may be stored in the memory 805. The instructions 809a may be executable by the processor 803 to implement the methods disclosed herein. Executing the instructions 809a may involve the use of the data 807a that is stored in the memory 805. When the processor 803 executes the instructions 809, various portions of the instructions 809b may be loaded onto the processor 803, and various pieces of data 807b may be loaded onto the processor 803.

The wireless communication device 804 may also include a transmitter 811 and a receiver 813 to allow transmission and reception of signals to and from the wireless communication device 804 via an antenna 817. The transmitter 811 and receiver 813 may be collectively referred to as a transceiver 815. The wireless communication device 804 may also include (not shown) multiple transmitters, multiple antennas, multiple receivers and/or multiple transceivers.

The wireless communication device 804 may include a digital signal processor (DSP) 821. The wireless communication device 804 may also include a communications interface 823. The communications interface 823 may allow a user to interact with the wireless communication device 804.

The various components of the wireless communication device 804 may be coupled together by one or more buses, which may include a power bus, a control signal bus, a status signal bus, a data bus, etc. For the sake of clarity, the various buses are illustrated in FIG. 8 as a bus system 819.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 2, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

We claim:

1. A method for optimized page matching, comprising:
reading a portion of a sub-slot of a paging channel;
extracting a page message from the portion of the sub-slot;
performing a page matching procedure prior to the end of the sub-slot from which the page message is extracted; and
initiating a procedure to return to sleep mode if the page matching procedure indicates that the page message is an empty general page message.

2. The method of claim 1, further comprising initiating a procedure to switch to active mode if the page matching procedure indicates that the page message is a direct page message.

3. The method of claim 1, wherein the method is performed by a wireless communication device.

4. The method of claim 3, further comprising initiating a procedure to return to sleep mode if the page message is neither an empty general page message nor a direct page message and the wireless communication device has been awake for eight consecutive sub-slots.

5. The method of claim 3, further comprising reading a portion of a next sub-slot if the page message is neither an empty general page message nor a direct page message and the wireless communication device has not been awake for eight consecutive sub-slots.

6. The method of claim 3, wherein the method increases sleep time of the wireless communication device.

7. The method of claim 3, wherein the wireless communication device is operating in an optimal network that transmits one of an empty general page message and a direct page message during a first sub-slot of a slot.

8. The method of claim 3, wherein the wireless communication device is operating in a non-optimal network that transmits one of an empty general page message and a direct page message during a sub-slot subsequent to a first sub-slot of a slot.

9. The method of claim 1, wherein the method reduces awake time of one subscription in slotted mode, thereby reducing conflicts between dual subscriptions wake-up in dual SIM dual standby devices.

10. The method of claim 1, wherein the page matching procedure comprises quick page matching.

11. The method of claim 1, wherein the page message is received via a paging channel.

12. The method of claim 1, wherein the page message is not received via a quick paging channel.

13. A wireless device configured for optimized page matching, comprising:
   a processor;
   memory in electronic communication with the processor;
   instructions stored in the memory, the instructions being executable by the processor to:
   read a portion of a sub-slot of a paging channel;
   extract a page message from the portion of the sub-slot;
   perform a page matching procedure prior to the end of the sub-slot from which the page message is extracted; and
   initiate a procedure to switch to active mode if the page matching procedure indicates that the page message is a direct page message.

14. The wireless device of claim 13, wherein the instructions are further executable to initiate a procedure to return to sleep mode if the page matching procedure indicates that the page message is an empty general page message.

15. The wireless device of claim 13, wherein the wireless device is a wireless communication device.

16. The wireless device of claim 15, wherein the instructions are further executable to initiate a procedure to return to sleep mode if the page message is neither an empty general page message nor a direct page message and the wireless communication device has been awake for eight consecutive sub-slots.

17. The wireless device of claim 15, wherein the instructions are further executable to read a portion of a next sub-slot if the page message is neither an empty general page message nor a direct page message and the wireless communication device has not been awake for eight consecutive sub-slots.

18. The wireless device of claim 15, wherein the wireless device has an increased sleep time.

19. The wireless device of claim 15, wherein the wireless device is operating in an optimal network that transmits one of an empty general page message and a direct page message during a first sub-slot of a slot.

20. The wireless device of claim 15, wherein the wireless device is operating in a non-optimal network that transmits one of an empty general page message and a direct page message during a sub-slot subsequent to a first sub-slot of a slot.

21. The wireless device of claim 13, wherein the instructions when executed by the processor reduce awake time of one subscription in slotted mode, thereby reducing conflicts between dual subscriptions wake-up in dual SIM dual standby devices.

22. The wireless device of claim 13, wherein the page matching procedure comprises quick page matching.

23. The wireless device of claim 13, wherein the page message is received via a paging channel.

24. The wireless device of claim 13, wherein the page message is not received via a quick paging channel.

25. A computer-program product for optimized page matching, the computer-program product comprising a non-transitory computer-readable medium having instructions thereon, the instructions comprising:
   code for causing a wireless device to read a portion of a sub-slot of a paging channel;
   code for causing the wireless device to extract a page message from the portion of the sub-slot;
   code for causing the wireless device to perform a page matching procedure prior to the end of the sub-slot from which the page message is extracted; and
   code for causing the wireless device to initiate a procedure to return to sleep mode if the page matching procedure indicates that the page message is an empty general page message.

26. The computer-program product of claim 25, further comprising code executable to initiate a procedure to switch to active mode if the page matching procedure indicates that the page message is a direct page message.

27. A wireless device configured for optimized page matching, comprising:
   a processor;
   memory in electronic communication with the processor;
   instructions stored in the memory, the instructions being executable by the processor to:
   read a portion of a sub-slot of a paging channel;
   extract a page message from the portion of the sub-slot, wherein the page message is received via a paging channel; and
   perform a page matching procedure prior to the end of the sub-slot from which the page message is extracted.

28. A wireless device configured for optimized page matching, comprising:
   a processor;
   memory in electronic communication with the processor;
   instructions stored in the memory, the instructions being executable by the processor to:
   read a portion of a sub-slot of a paging channel;
   extract a page message from the portion of the sub-slot, wherein the page message is not received via a quick paging channel; and
   perform a page matching procedure prior to the end of the sub-slot from which the page message is extracted.

29. A wireless device configured for optimized page matching, comprising:
   means for reading a portion of a sub-slot of a paging channel;
   means for extracting a page message from the portion of the sub-slot;

means for performing a page matching procedure prior to the end of the sub-slot from which the page message is extracted; and means for initiating a procedure to return to sleep mode if the page matching procedure indicates that the page message is an empty general page message.

30. The wireless device of claim 29, wherein the empty general page message indicates that no more direct page messages will be sent to the wireless device for a slot cycle.

* * * * *